Dec. 25, 1928.

E. MARTIN

SELF FEEDING LUBRICATOR

Filed April 21, 1927

1,696,774

Patented Dec. 25, 1928.

1,696,774

UNITED STATES PATENT OFFICE.

EMILE MARTIN, OF GRENOBLE, FRANCE.

SELF-FEEDING LUBRICATOR.

Application filed April 21, 1927, Serial No. 185,543, and in Belgium April 21, 1926.

The present invention is relating to a self-feeding lubricator assuring an automatic continuous lubrication without any manual operation and applicable to all mechanical movable apparatus subject to frictional effects.

According to the invention, the self-feeding lubricator comprises a contractible filling-member disposed in the grease cup and embedded in the lubricant, said member being compressed by forcing said lubricant by pressure and in the usual manner in said cup. The lubricator, which is previously mounted on a bearing or another element to be greased, is thus ready to function continuously.

As the lubricant is delivered to the parts to be lubricated, said contractible member presses on the surrounding remaining grease contained in the cup and forces it out by the increase of size resulting from its elasticity or detent.

The drawing accompanying the description shows a form of realization of the invention.

A is a reservoir containing the lubricant, said cup having suitable form and arrangement.

Preferably said cup is constituted by two parts connected together by means of a screw-thread, one of said parts being provided with a retaining valve, such as a ball-valve B, which allows the introduction of lubricant by pressure in said cup, and the other of said parts being provided with a projecting outlet conduit C connected at the part to be lubricated by the threading D on the part to be greased.

This arrangement presents no particular features and may be realized in any suitable manner, however its combination with a contractible pneumatic member as above-mentioned forms the object of the present invention.

Figure 1:
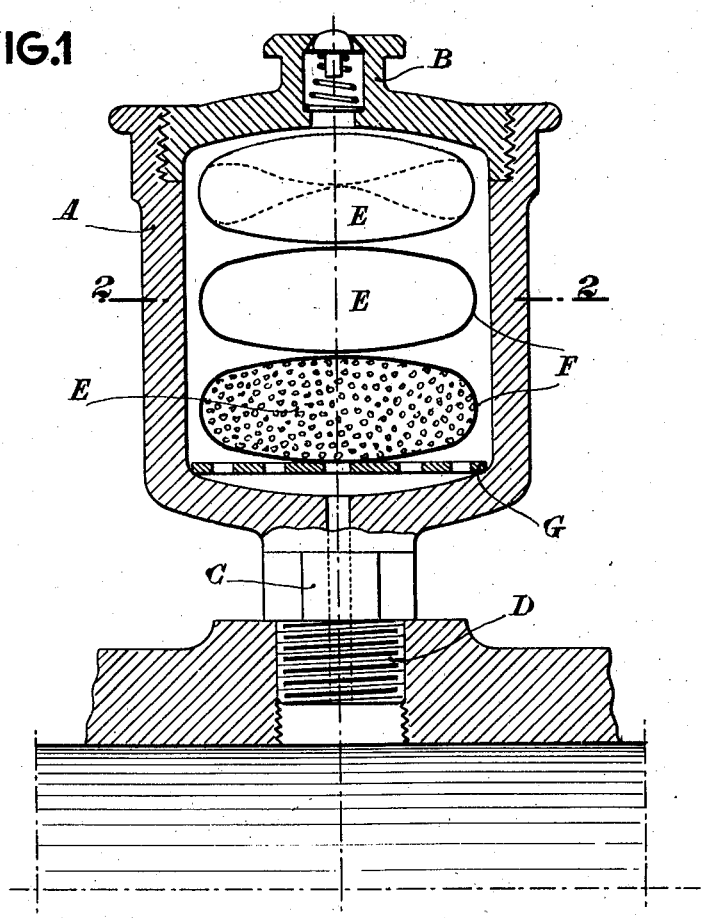
Fig. 1 is a vertical plan view of this realization.
Figure 2:
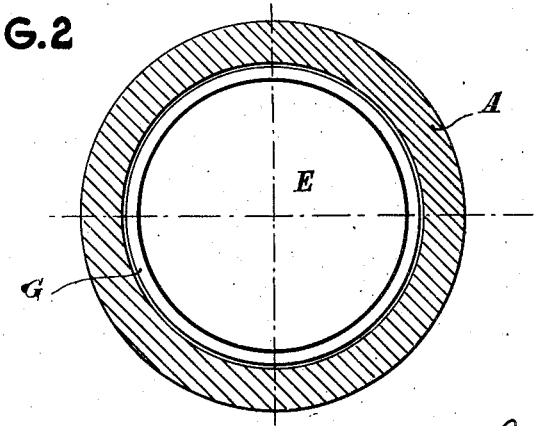
Fig. 2 is a horizontal plan view according to line 2—2 of Fig. 1.

In the example shown in Fig. 1, the pneumatic member is formed by means of one or several elements E. These elements are themselves constituted by a certain volume of gaseous fluid enclosed in a cover impermeable to gases and to grease.

This cover is made of elastic, flexible, supple materials, used alone or in combination with each other, and superposed, pasted or tied.

The gaseous mass may also be formed of a porous, supple, flexible, elastic material, such as sponge-rubber for example, this material being surrounded and protected by an envelope as given above.

The greasing constituted as described above and shown on a mechanism, for example, may be charged by the stop valve B with the lubricant introduced by pressure in the usual way; this lubricant surrounds and compresses all parts of the compressible member E, and then it reaches the pipe C, crossing the grating G and, from there, the part to be lubricated.

The size of the contractible member decreases during the charge of lubricant and in proportion with the increase of pressure.

The lubricant fills the free space resulting of the contraction of said member, thus forming a reserve of compressed grease, said reserve feeding automatically the part, to be greased, with lubricant as soon as the grease discharged through the conduit C is used and eliminated and that whatever may be the position of the lubricator. It is possible to control the grease charge of the lubricator by pressing the ball-valve B downwards.

It may be noted that any contact between the gaseous medium contained in the contractible pneumatic member and the lubricant is avoided owing to the fact that a yielding and air-tight film F is interposed between said medium and said lubricant.

The film has a very high flexibility and may follow several modifications of size and shape of the contractible mass to be isolated, without risks for the film to be teared or unglued.

The shape of the contractible pneumatic member is independent of the shape of the lubricator, and it is possible to utilize any contractible member in combination with lubricators of the usual type, without modifying their construction. On the other hand, it is possible to maintain until the lubricator is completely discharged, a high pressure in the cup, by introducing in one or more of said discs, or in one or more balloons E, a supplementary volume of gases, as said discs or balloons are manufactured, in order to increase the initial pressure.

It is to be understood that the embodiments as shown may vary according to the circumstances without departing from the scope of the present invention.

The contractible member E can be formed in various ways, either by varying the nature of the materials which constitute it, or by modifying the form and the dimensions of these different parts.

What I claim as my invention and desire to secure by Letters Patent is:—

1. A grease cup having filling and discharge openings and also having an expanded member in said cup, disconnected therefrom, totally immersed in the grease in the cup when the latter is full and active by its own expansion to force grease from the cup through the discharge opening.

2. A grease cup as claimed in claim 1 including also a grate between said expansible member and the discharge opening.

3. A grease cup as claimed in claim 1 in which said inlet opening is provided with a spring actuated valve active to normally close said opening.

4. A grease cup as claimed in claim 1 in which said expansible member consists of an envelope charged with fluid under compression.

5. A grease cup as claimed in claim 1 in which said expansible member consists of a filler of elastic and porous material in the pores of which a gas is occluded and an impermeable envelope entirely covering said filler.

In witness whereof I have signed this specification.

EMILE MARTIN.